United States Patent
Tsai et al.

(10) Patent No.: US 10,942,555 B2
(45) Date of Patent: Mar. 9, 2021

(54) POWER SUPPLYING METHOD FOR COMPUTER SYSTEM

(71) Applicant: MITAC COMPUTING TECHNOLOGY CORPORATION, Hsinchu (TW)

(72) Inventors: Ming-Li Tsai, Taoyuan (TW); Jyun-Jie Wang, Taoyuan (TW); Cheng-Tung Wang, Taoyuan (TW); Chia-Ming Liu, Taoyuan (TW); Ming-Hsuan Tsai, Taoyuan (TW)

(73) Assignee: Mitac Computing Technology Corporation, Hsinchu (TW)

(*) Notice: Subject to any disclaimer, the term of this patent is extended or adjusted under 35 U.S.C. 154(b) by 192 days.

(21) Appl. No.: 16/163,775

(22) Filed: Oct. 18, 2018

(65) Prior Publication Data

US 2019/0121413 A1    Apr. 25, 2019

(30) Foreign Application Priority Data

Oct. 24, 2017 (TW) ................................. 106136510

(51) Int. Cl.
*G06F 1/30* (2006.01)
*G06F 1/26* (2006.01)

(52) U.S. Cl.
CPC ................ *G06F 1/30* (2013.01); *G06F 1/263* (2013.01)

(58) Field of Classification Search
CPC ...................................... G06F 1/26; G06F 1/32
See application file for complete search history.

(56) References Cited

U.S. PATENT DOCUMENTS

| 2011/0112700 A1* | 5/2011 | Tajima ............. H04L 12/40045 700/293 |
| 2011/0131429 A1* | 6/2011 | Tajima .................... G06F 1/266 713/310 |
| 2014/0344389 A1* | 11/2014 | Hsieh .................... G06F 13/362 709/208 |

(Continued)

FOREIGN PATENT DOCUMENTS

TW            201428476 A            7/2014

OTHER PUBLICATIONS

Search Report appended to an Office Action issued to Taiwanese counterpart application No. 106136510 by the TIPO dated Aug. 17, 2018.

*Primary Examiner* — Kim Huynh
*Assistant Examiner* — Kevin M Stewart
(74) *Attorney, Agent, or Firm* — Michael Best & Friedrich LLP

(57) ABSTRACT

A power supplying method for a computer system is proposed. The computer system includes a first computer node, a first power supply unit corresponding to the first computer node, a second computer node, a second power supply unit corresponding to the second computer node, and a connection module electrically connected to the computer nodes and the power supply units. The power supplying method includes: detecting, by the first computer node, whether the second power supply unit operates abnormally; and upon detecting at least that the second power supply unit operates abnormally, controlling, by the first computer node, the first power supply unit to provide electric power to the second computer node through the connection module.

10 Claims, 2 Drawing Sheets

(56) References Cited

U.S. PATENT DOCUMENTS

2016/0294210 A1\* 10/2016 Nguyen ................... H02J 9/06
2017/0168535 A1\* 6/2017 Ragupathi ................ G06F 1/28
2017/0317525 A1\* 11/2017 Navarro ................. H02J 9/062
2018/0143263 A1\* 5/2018 Humphrey ................ H02J 3/06

\* cited by examiner

POWER SUPPLYING METHOD FOR COMPUTER SYSTEM

CROSS-REFERENCE TO RELATED APPLICATION

This application claims priority of Taiwanese Invention Patent Application No. 106136510, filed on Oct. 24, 2017.

FIELD

The disclosure relates to a power supplying method for a computer system, and more particularly to a method for supplying power among multiple computer nodes of a computer system.

BACKGROUND

A conventional computer server system usually includes multiple computer nodes and multiple power supply modules respectively corresponding to the computer nodes. Since each power supply module only provides electric power to the corresponding computer node, a computer node may stop operation when the corresponding power supply module is unable to provide the required electric power because of, for example, abnormal operation or shutting-down.

However, the computer server system often requires multiple computer nodes to cooperatively complete complicated tasks; if merely the malfunction of a power supply module can cause non-operation of the corresponding computer node, the other computer nodes that normally operate have to cover for the non-operating computer node to complete the complicated task, increasing the work load of the other computer nodes, and thus stability and efficiency of the entire computer server system will be significantly affected.

SUMMARY

Therefore, an object of the disclosure is to provide a power supplying method that may enable mutual power support for the computer nodes and the corresponding power supply modules.

According to the disclosure, the power supplying method for a computer system is proposed to include steps of: (A) providing a computer system that includes a first computer node, a first power supply unit electrically connected to the first computer node, a second computer node, a second power supply unit electrically connected to the second computer node, and a connection module electrically connected to the first computer node, the first power supply unit, the second computer node and the second power supply unit, the first computer node including a baseboard management controller; (B) detecting, by the baseboard management controller through the connection module, whether the second power supply unit operates abnormally; and (C) upon detecting at least that the second power supply unit operates abnormally, controlling, by the baseboard management controller, the first power supply unit to provide electric power to the second computer node through the connection module.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
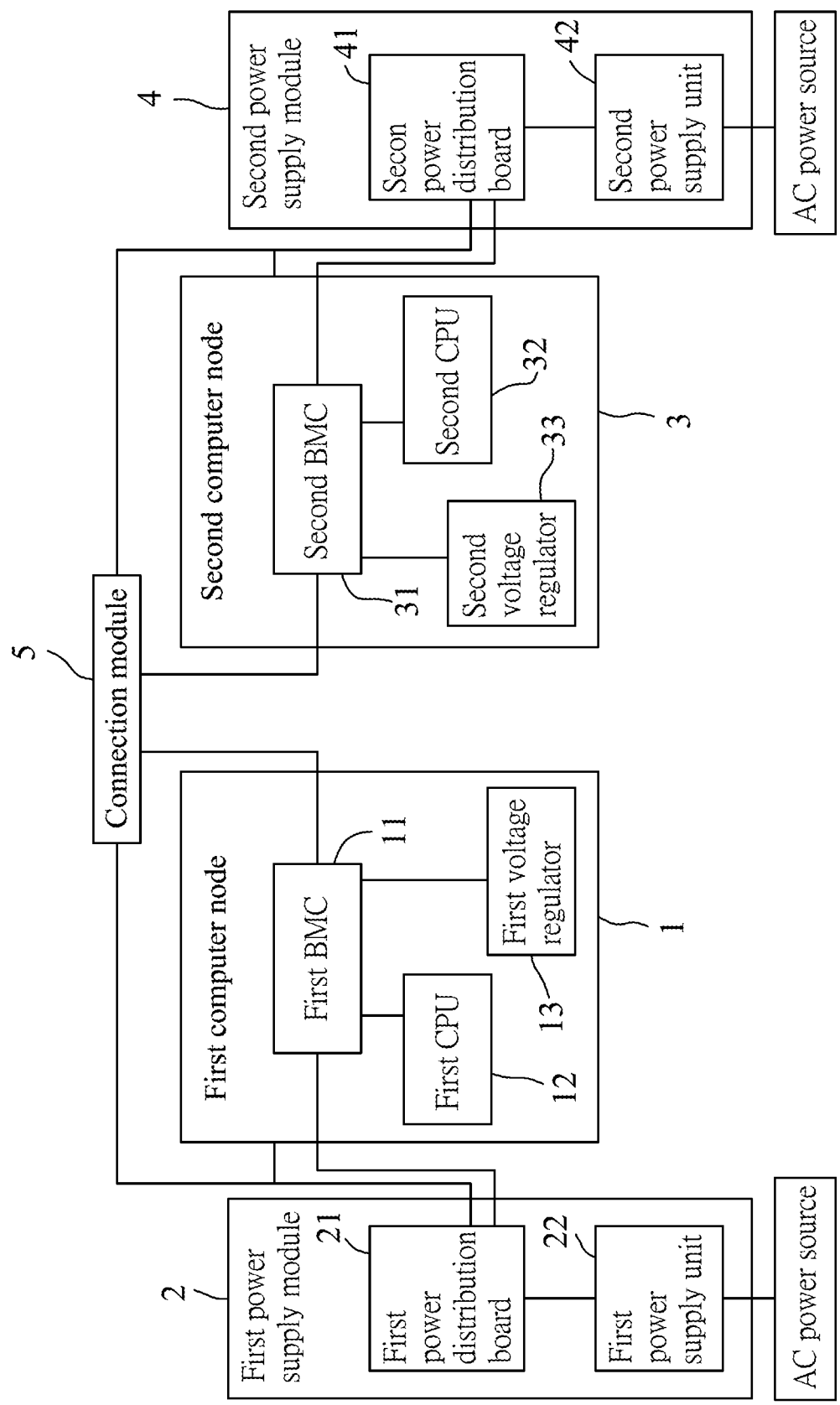
FIG. 1 is a block diagram illustrating a computer system that implements an embodiment of the power supplying method according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the power supplying method is implemented by a computer system. The computer system includes a first computer node 1, a first power supply module 2 corresponding to the first computer node 1, a second computer node 3, a second power supply module 4 corresponding to the second computer node 3, and a connection module 5. In this embodiment, the computer system is a rack server system, and the connection module 5 is a backplane of the rack server system, but this disclosure is not limited in this respect. The first computer node 1 and the first power supply module 2 cooperatively form a system that can work independently, and the second computer node 3 and the second power supply module 4 cooperatively form a system that can work independently. In one embodiment, the first power supply module 2 may be included in the first computer node 1, and the second power supply module 4 may be included in the second computer node 3, but this disclosure is not limited in this respect.

The first computer node 1 includes a first baseboard management controller 11 electrically connected to the connection module 5, a first central processing unit 12 electrically connected to the first baseboard management controller 11, and a first voltage regulator 13 electrically connected to the first baseboard management controller 11. The first baseboard management controller 11 monitors the first central processing unit 12 and generates first monitoring information corresponding to an operation condition of the first central processing unit 12. Furthermore, the first baseboard management controller 11 monitors the first voltage regulator 13 and generates first electric power demand information indicating electric power required by the first computer node 1 to maintain its normal operation.

The second computer node 3 includes a second baseboard management controller 31 electrically connected to the connection module 5, a second central processing unit 32 electrically connected to the second baseboard management controller 31, and a second voltage regulator 33 electrically connected to the second baseboard management controller 31. The second baseboard management controller 31 monitors the second central processing unit 32 and generates second monitoring information corresponding to an operation condition of the second central processing unit 32. Furthermore, the second baseboard management controller 31 monitors the second voltage regulator 33 and generates second electric power demand information indicating electric power required by the second computer node 3 to maintain its normal operation.

In this embodiment, the first (second) baseboard management controller 11 (31) may use PECI (platform environment control interface, for x86 CPU) or the I²C interface (for ARM CPU) to monitor the first (second) central processing unit 12 (32), and the first and second baseboard management controller 11, 13 may communicate with each other using the I²C interface, but this disclosure is not limited in this respect.

The first power supply module 2 includes a first power distribution board 21 electrically connected to the first computer node 1 and the connection module 5, and a first power supply unit 22 electrically connected to the first power distribution board 21. The first power supply unit 22 is electrically connected to an alternating current (AC) power source for receiving AC power therefrom, and includes an AC-to-DC converter to convert the AC power into DC power which is provided to the first computer node 1 through the first power distribution board 21.

The second power supply module 4 includes a second power distribution board 41 electrically connected to the second computer node 3 and the connection module 5, and a second power supply unit 42 electrically connected to the second power distribution board 41. The second power supply unit 42 is electrically connected to an AC power source for receiving the AC power therefrom, and includes an AC-to-DC converter to convert the AC power into DC power which is provided to the second computer node 3 through the second power distribution board 41.

Figure 2:
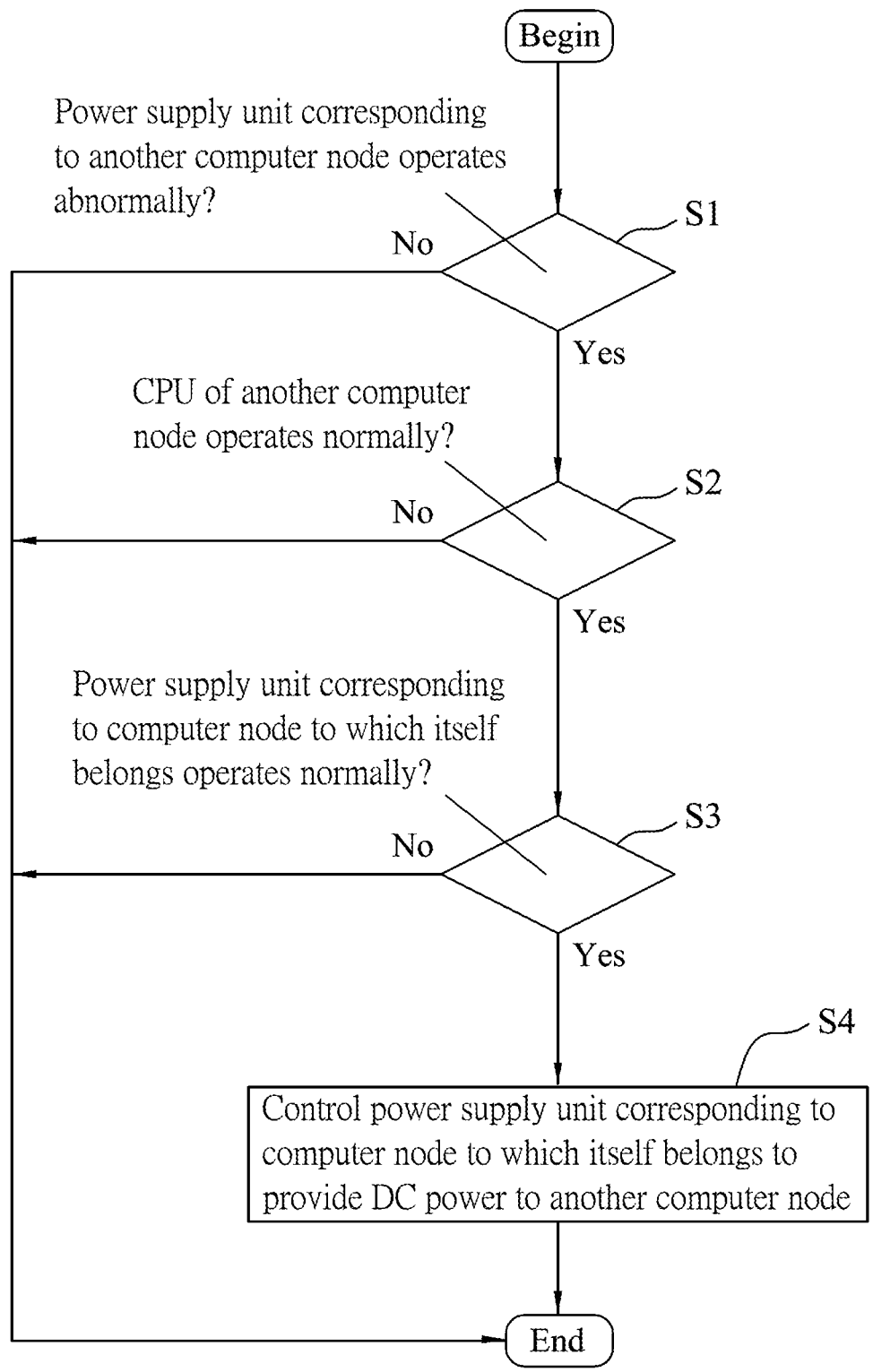
FIG. 2 is a flow chart illustrating steps of the embodiment.

Referring to FIGS. 1 and 2, the embodiment of the power supplying method for the computer system includes steps S1 through S4, which are performed with respect to each computer node.

In step S1, the baseboard management controller of the computer node detects whether the power supply unit corresponding to another computer node operates abnormally. For example, the first baseboard management controller 11 detects, through the connection module 5 and the second power distribution board 41, whether the second power supply unit 42 is unable to provide DC power. In this embodiment, the baseboard management controller monitors the operation state of the power supply unit by detecting whether some specific signals provided by pins of the GPIO interface of the corresponding power distribution board are at normal voltage levels. The specific signals may include, for example, a present signal that indicates whether the power supply module is present, an AC_OK signal that indicates whether an AC input of the power supply module is normal, and a DC_OK signal that indicates whether a DC output of the power supply module is normal. The first baseboard management controller 11 determines that the second power supply unit 42 operates abnormally upon detecting that the second power supply unit 42 is unable to provide DC power, and determines that the second power supply unit 42 operates normally upon detecting that the second power supply unit 42 is able to provide DC power. When the baseboard management controller of the computer node detects that the power supply unit corresponding to said another computer node operates abnormally, the flow goes to step S2.

In step S2, the baseboard management controller of the computer node detects whether the central processing unit of said another computer node operates normally. It is noted that capacitors used in circuits of said another computer node may support operation of said another computer node for a while after the corresponding power supply unit becomes abnormal, so the baseboard management controller of the computer node can still acquire monitoring information from the baseboard management controller of said another computer node. For example, the first baseboard management controller 11 receives the second monitoring information from the second baseboard management controller 31 through the connection module 5, and determines whether the second central processing unit 32 of the second computer node 3 operates normally based on the second monitoring information. In practice, the baseboard management controller may determine the operation condition of the central processing unit based on a register value indicating a temperature of the central processing unit, but this disclosure is not limited in this respect. In this embodiment, the first computer node 1 and the second computer node 3 perform two-way monitoring, that is, the first and second computer nodes 1, 3 monitor the operation states of each other. In other embodiments, one-way monitoring may be implemented, that is, one of the first and second computer nodes 1, 3 may be set as a master node, and the other one of the first and second computer nodes 1, 3 may be set as a slave node, while only the slave node reports the operation state thereof to the master node. When the baseboard management controller of the computer node detects that the central processing unit of said another computer node operates normally, the flow goes to step S3.

In step S3, the baseboard management controller of the computer node detects whether the power supply unit corresponding to the computer node to which the baseboard management controller belongs operates normally. For example, the first baseboard management controller 11 detects whether the first power supply unit 22 is able to provide DC power. The first baseboard management controller 11 determines that the first power supply unit 22 operates normally upon detecting that the first power supply unit 22 is able to provide DC power, and determines that the first power supply unit 22 operates abnormally upon detecting that the first power supply unit 22 is unable to provide DC power. When the baseboard management controller of the computer node detects that the power supply unit corresponding to the computer node to which itself belongs operates normally, the flow goes to step S4 to activate a power support mechanism.

In step S4, the baseboard management controller controls the power supply unit corresponding to the computer node to which the baseboard management controller belongs to provide DC power to said another computer node in addition to providing DC power to the computer node. It should be noted that, each of the power supply units is independently controlled by the baseboard management controller of the corresponding computer node to provide DC power to the computer node when all of the power supply units operate normally. The computer node receives DC power from the power supply unit corresponding to another computer node only when its corresponding power supply unit operates abnormally and the power support mechanism is activated. For example, in step S4, the first baseboard management controller 11 receives the second electric power demand information from the second baseboard management controller 31 through the connection module 5, and acquires information regarding DC power required by the second computer node 3, thereby controlling the first power supply unit 22 to increase provision of DC power, so as to provide to the second computer node 3 the DC power required thereby, while maintaining steady provision of sufficient DC power to the first computer node 1. The first baseboard management controller 11 provides DC power to the second computer node 3 through the first power distribution board 21, the connection module 5 and the second power distribution board 41. In one implementation, the baseboard management controller (e.g. the first baseboard management controller 11) may determine, after step S1 and before step S4, whether the power supply unit (i.e., the first power supply unit 22 in the example) corresponding to the computer node (e.g., the first computer node 1) to which the baseboard management controller belongs is capable of simultaneously supplying electric power required by said computer node (e.g., the first computer node 1) and electric power required by said another computer node (e.g., the second computer node 3) based on the first and second electric power demand information; and step S4 is performed only when the determination is affirmative.

Although the embodiment is exemplified by using the first power supply unit 22 supporting the second computer node 3 in terms of DC power, in a condition that the first power supply unit 22 is unable to provide DC power to the first computer node 1, the second baseboard management controller 31 may determine whether to control the second power supply unit 42 to support DC power for the first computer node 1 by carrying out the same steps.

In other words, when both of the first power supply unit 22 and the second power supply unit 42 operate normally, the power support mechanism would not be activated, and the first and second power supply units 22, 42 only provide DC power to the corresponding computer nodes, i.e., the first computer node 1 and the second computer node 3, respectively, When either one of the power supply units 22, 42 operates abnormally, the power support mechanism would be activated such that the other power supply unit 42, 22 would increase provision of electric power to provide DC power to the computer node 1, 3 whose corresponding power supply unit 22, 42 operates abnormally, while maintaining steady provision of DC power to its corresponding computer node 3, 1, thereby preventing the computer node 1, 3 whose corresponding power supply unit 22, 42 operates abnormally from being unable to normally work due to lack of electric power.

In summary, the power supplying method for a computer system according to this disclosure uses a baseboard management controller of a computer node of the computer system to control a corresponding power supply unit to support electric power to another computer node upon determining that a power supply unit corresponding to said another computer node operates abnormally and that the central processing unit of said another computer node still operates normally, thereby preventing said another computer node from abnormal operation due to lack of electric power.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A power supplying method for a computer system, comprising steps of:
   (A) providing a computer system that includes a first computer node, a first power supply module that includes a first power supply unit electrically connected to the first computer node, a second computer node, a second power supply module that includes a second power supply unit electrically connected to the second computer node, and a connection module electrically connected to the first computer node, the first power supply unit, the second computer node and the second power supply unit, the first computer node including a first baseboard management controller, wherein the first computer node and the first power supply module cooperatively form a first system that is capable of working independently, and the second computer node and the second power supply module cooperatively form a second system that is capable of working independently;
   (B) detecting, by the first baseboard management controller through the connection module, whether the second power supply unit operates abnormally; and
   (C) upon detecting at least that the second power supply unit operates abnormally, controlling, by the first baseboard management controller, the first power supply unit to provide electric power to the second computer node through the connection module; wherein the second computer node includes a second baseboard management controller that generates electric power demand information corresponding to electric power required by the second computer node;
   wherein step (C) includes:
      receiving, by the first baseboard management controller through the connection module, the electric power demand information from the second baseboard management controller; and
      upon detecting at least that the second power supply unit operates abnormally, controlling, by the first baseboard management controller, the first power supply unit to provide electric power required by the second computer node to the second computer node through the connection module based on the electric power demand information; and,
   wherein the second baseboard management controller is configured to receive additional demand information from the first baseboard management controller, detect whether the first power supply unit operates abnormally, and control the second power supply unit to provide electric power required by the first computer node to the first computer node through the connection module based on the additional demand information.

2. The power supplying method of claim 1, further comprising a step of (D) detecting, by the first baseboard management controller through the connection module, whether the first power supply unit operates normally;
   wherein, in step (C), the first baseboard management controller controls the first power supply unit to provide electric power to the second computer node upon detecting at least that the second power supply unit operates abnormally and that the first power supply unit operates normally.

3. The power supplying method of claim 2, wherein, in step (B), the first baseboard management controller detects whether the second power supply unit operates abnormally by detecting whether the second power supply unit is able to provide direct-current (DC) power, and determines that the second power supply unit operates abnormally upon detecting that the second power supply unit is unable to provide DC power; and wherein, in step (D), the first baseboard management controller detects whether the first power supply unit operates normally by detecting whether the first power supply unit is able to provide DC power, and determines that the first power supply unit operates normally upon detecting that the first power supply unit is able to provide DC power.

4. The power supplying method of claim 2, wherein the second computer node includes the second baseboard management controller and a central processing unit electrically connected to the second baseboard management controller, the second baseboard management controller monitoring the central processing unit and generating monitoring information corresponding to an operation condition of the central processing unit; said power supplying method further comprising steps of: (E) receiving, by the first baseboard management controller, the monitor ng information from the second baseboard management controller through the connection module; and (F) determining, by the first baseboard management controller, whether the central processing unit of the second computer node operates normally based on the monitoring information; wherein, in step (C), the first baseboard management controller controls the first power supply unit to provide electric power to the second computer node upon detecting that the second power supply unit operates abnormally, that the first power supply unit operates normally, and that the central processing unit of the second computer node operates normally.

5. The power supplying method of claim 1, wherein the second computer node includes the second baseboard management controller and a central processing unit electrically connected to the second baseboard management controller, the second baseboard management controller monitoring the central processing unit and generating monitoring information corresponding to an operation condition of the central processing unit; said power supplying method further comprising steps of: (D) receiving, by the first baseboard management controller, the monitoring information from the second baseboard management controller through the connection module; and (E) determining, by the first baseboard management controller, whether the central processing unit the second computer node operates normally based on the monitoring information; wherein, in step (C), the first baseboard management controller controls the first power supply unit to provide electric power to the second computer node upon detecting that the second power supply unit operates abnormally and that the central processing unit of the second computer node operates normally.

6. The power supplying method of claim 1, wherein, in step (B), the first baseboard management controller detects whether the second power supply unit operates abnormally by detecting whether the second power supply unit is able to provide direct-current (DC) power, and determines that the second power supply unit operates abnormally upon detecting that the second power supply unit is unable to provide DC power.

7. The power supplying method of claim 1, wherein the second computer node further includes a voltage regulator, and the second baseboard management controller monitors the voltage regulator to generate the electric power demand information corresponding to electric power required by the second computer node.

8. The power supplying method of claim 1, wherein step (C) further includes: upon detecting at least that the second power supply unit operates abnormally, determining, by the first baseboard management controller, whether the first power supply unit is capable of simultaneously supplying electric power required by the first computer node and electric power required by the second computer node, and the first baseboard management controller controls the first power supply unit to provide electric power required by the second computer node to the second computer node through the connection module based on the electric power demand information only when the first baseboard management controller determines that the first power supply unit is capable of simultaneously supplying electric power required by the first computer node and electric power required by the second computer node.

9. The power supplying method of claim 1, wherein the first power supply unit is included in the first computer node, and the second power supply unit is included in the second computer node.

10. The power supplying method of claim 1, the first computer node controls the first power supply unit to provide electric power to the first power supply unit and receives electric power only from the first power supply unit when the first power supply unit operates normally, and the second computer node controls the second power supply unit to provide electric power to the second power supply unit and receives electric power only from the second power supply unit when the second power supply unit operates normally.

\* \* \* \* \*